FIG I

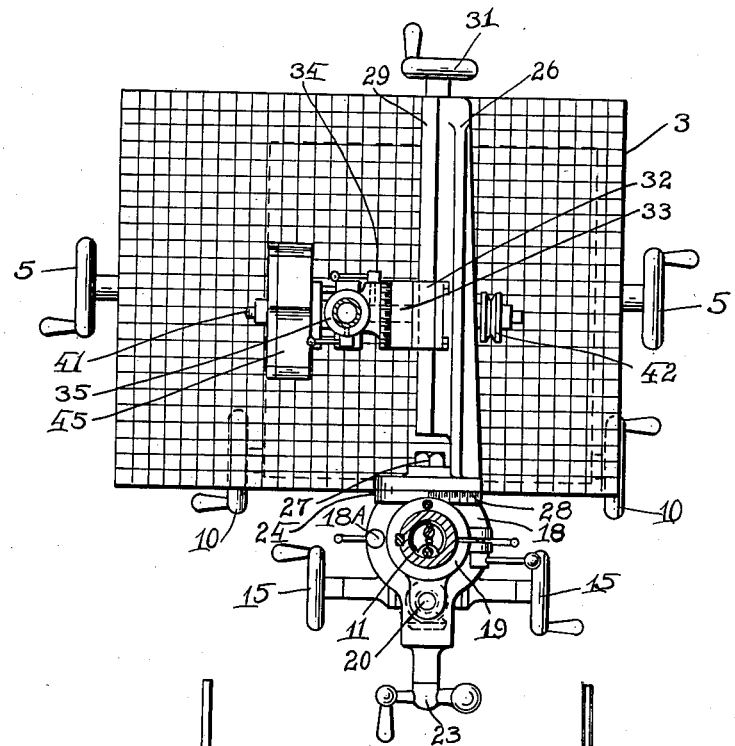

Patented Oct. 14, 1941

2,258,828

UNITED STATES PATENT OFFICE 2,258,828

UNIVERSAL PATTERN MAKING MACHINE

Henry L. Trebert, Canandaigua, N. Y.

Application January 23, 1939, Serial No. 252,388

2 Claims. (Cl. 144—134)

This invention relates to wood working machines for use in making patterns, core boxes etc., and has for its principal object to provide a machine in which the cutter head and its driving means may be universally adjusted to perform all cutting, boring and shaping operations in making simple as well as intricate shapes.

A further object of this invention is to provide a machine with which intricate shapes of patterns and core boxes may be made quickly and with ease.

These and other objects of the invention will become more clearly apparent from the detailed description thereof which follows, reference being had to the accompanying drawings in which Figure 1 is a side elevation of the machine.

Figure 3 is a horizontal sectional view taken on the line 3—3 of Figure 2.

Figure 4 is a detail front elevation of an extra cutter head for the machine.

Figure 5 is a vertical sectional view of the extra cutter head.

Figure 1:
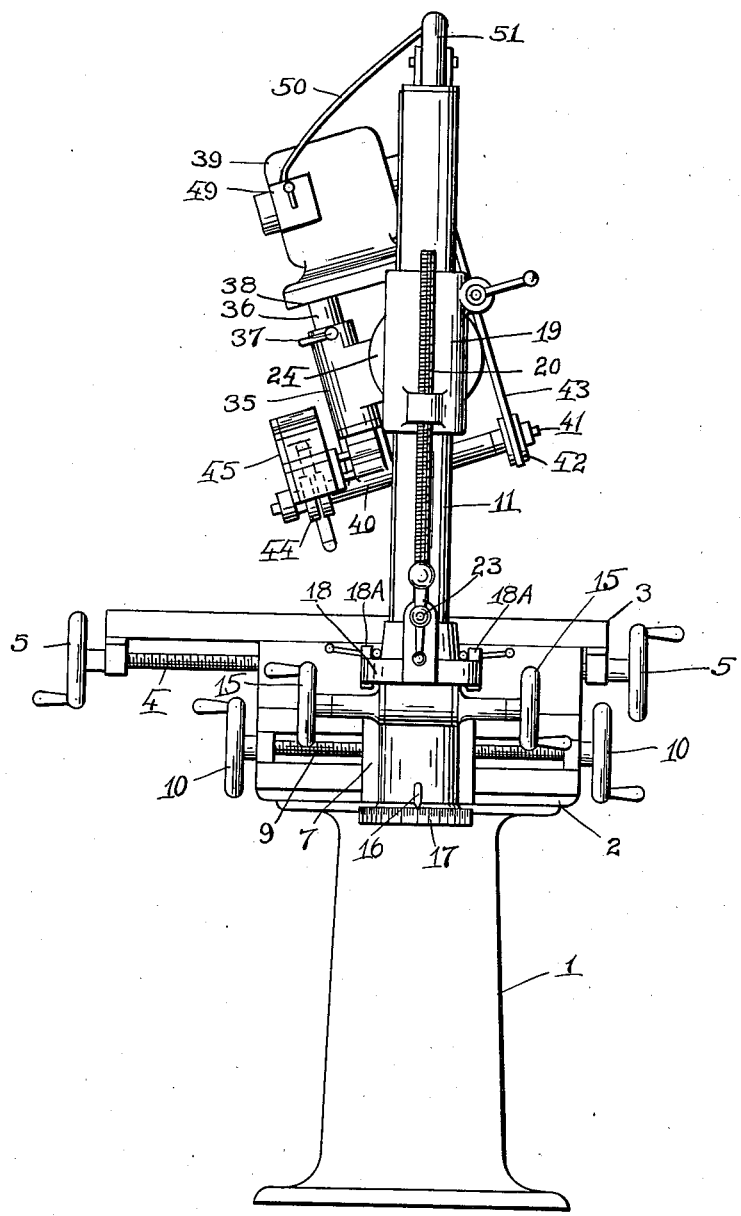
Figure 2:
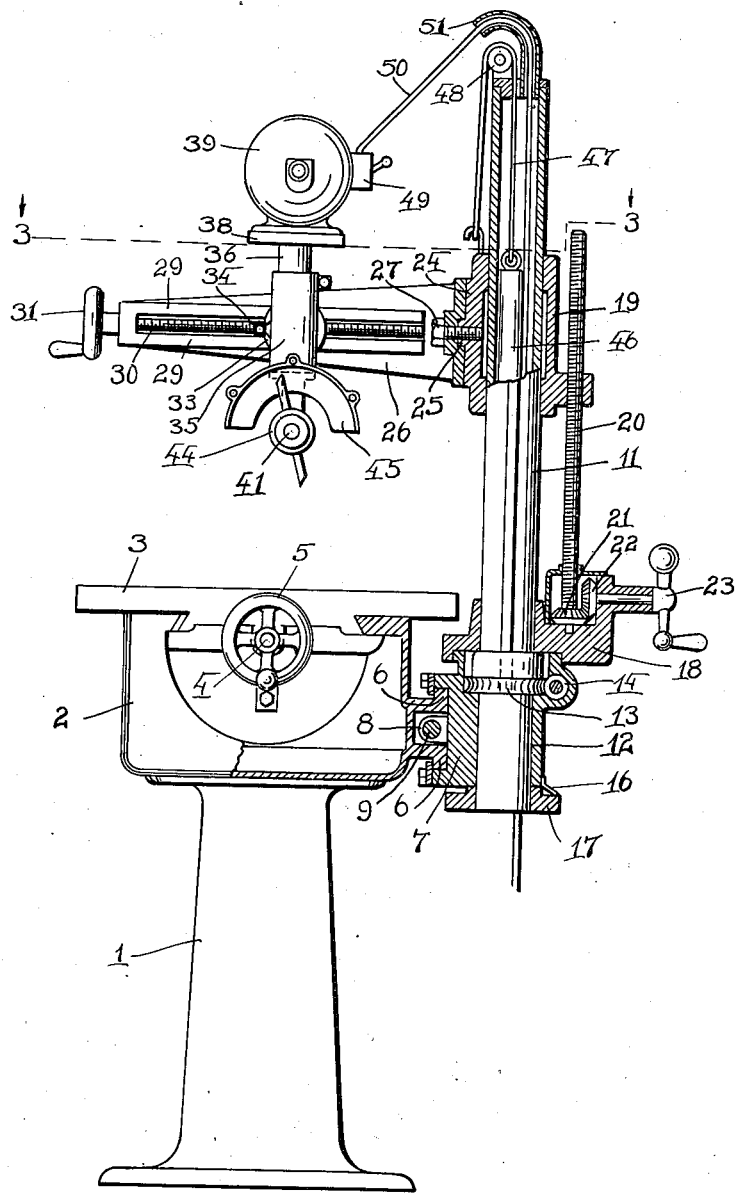
Figure 2 is a front elevation of the machine with portions of it shown in section.

The pattern making machine forming the subject matter of my present invention is especially adapted to perform practically every conceivable cutting, boring and shaping operation in the manufacture of patterns, core boxes and other wood work and may also be used for grinding, cutting, boring and shaping metal work.

Adjustments of the cutters can be made in any direction and to any position relative to the work which is mounted on the bed plate so that all operations, no matter how difficult to perform, may be done accurately and with ease.

As illustrated in the figures of the drawings, the machine comprises the base 1 which supports the bed 2 with the bed plate 3 slidably mounted on top thereof. Suitable guide means cooperating with each other provide a straight line horizontal movement for the bed plate on the bed and a feed screw 4, adapted to be operated by the hand wheels 5, 5 one at each end of the screw, is adapted to feed the bed plate back and forth on the table so as to locate or move the work mounted on the bed plate relative to the cutter of the machine.

On one side of the bed 2 are provided the cross rails 6, 6 on which is slidably supported the carriage 7. Mounted to rotate between the guide rails and threaded thru the lug 8 of the carriage 7 is the feed screw 9. Handwheels 10, 10 at each end of the cross rails operate the screw to move the carriage back and forth on the side of the bed.

The carriage serves as the movable support for the upright 11 and is provided with the bearing 12 for revolvably supporting the bottom end of this upright. A worm gear 13 is keyed to the upright within the carriage and meshes with the worm 14 so that on the rotation of the worm by means of the handwheels 15, 15 the upright may be rotated in either direction on the carriage 7. A pointer 16 on the carriage 7 cooperates with an indexing wheel 17 carried by the upright below the carriage and indicates any angular adjustment of the upright made with the handwheels 15.

A collar 18 is keyed to the upright 11 on top of the carriage 7 and clamping bolts 18A, 18A, carried by the collar, are adapted to fixedly clamp the upright in place in the carriage. Splined on the upright 11 so as to be movable up and down thereon is the arm girdle 19 and a feed screw 20 revolvably supported on the collar 18 and threaded thru a lug on the girdle 19 adjustably elevates and lowers the girdle on the rotation of the feed screw by means of the bevel pinions 21 and 22 which are operated by the ball handle 23.

The girdle 19 is provided on its side with a pivot base 24 with a central pivot member 25 and on this pivot base and pivot member is revolvably supported the supporting arm 26. A clamping bolt 27, passing thru the inner end of the arm 26 and threaded into the pivot member 25, is adapted to adjustably clamp the arm in any angular position on the girdle 19 and to indicate the angular position of the arm on the girdle the edge of the pivot base 24 is provided with the index 28.

On one side of the supporting arm 26 are provided the guide rails 29, 29 and between them and parallel thereto is mounted to rotate the feed screw 30 which is operated by the hand wheel 31 from the free end of the supporting arm. Slidably supported by the guide rails 29 and operated by the feed screw 31 so as to move back and forth on the arm 26 is the carriage 32. This carriage has swiveled thereon the head 33 which is adapted to be clamped to the carriage in any angular position relative thereto by means of the clamping bolt 34. The head 33 is provided with the supporting sleeve 35 in which is revolvably mounted the post 36. A clamping bolt 37 in the top of the supporting sleeve is adapted to adjustably clamp the post in any angular position in the supporting sleeve.

At the top of the post 36 is mounted the platform 38 on which is mounted the electric motor 39. From the bottom of the post is suspended the spindle bearing 40 in which is mounted to rotate the spindle 41. A pulley 42, carried by the spindle, is operatively connected with the motor by means of the belt 43 for the operation of the spindle. A suitable cutter 44 is adapted to be mounted on the spindle so as to revolve in the semi-cylindrical guard housing 45 supported in front of the spindle bearing 40.

To facilitate the vertical adjustment of the supporting arm 26 on the upright 11, the upright is made hollow to have suspended therein the counterweight 46. This weight is adapted to counter-balance the weight of the girdle 19 and arm 29 with all members supported thereon in order to provide for its ready movement on the upright by the feed screw 20. The counterweight 46 is connected with the girdle 19 by means of the cable 47 which passes over the pulley 48 at the top of the upright 11.

In order to provide for a constantly adjustable electric connection for the electric motor 39 its switch box 49 is connected with a flexible electric cable 50 thru the hollow goose neck 51 which forms a continuation of the hollow upright 11. The electric cable can thus move in and out of the upright as the supporting arm is raised and lowered in order to provide a constant electric connection for the motor in any of its adjusted positions.

I claim:

1. In a woodworking machine the combination of a base, a carriage movable laterally on said base, an upright revolvably mounted on said carriage, means movable with said carriage for revolving said upright on said carriage, a collar on said upright revolvably therewith, an arm movable on said upright projecting at right angles therefrom, a feed screw revolvable on said collar parallel to said upright and in threaded engagement with said arm for movement of said arm on said upright, a head movable on said arm, a post revolvably mounted in said head to one side of said arm, a spindle bearing at the bottom of said post extending transversely thereof for revolvable adjustment with said post at the bottom of said arm, a spindle in said bearing, a cutter carried by said spindle, driving means at the top of said post for revolvable adjustment with said post, and means connecting said driving means with said spindle.

2. In a woodworking machine the combination of a base, a carriage movable back and forth on one side of said base, an upright revolvably mounted on said carriage, means movable with said carriage for revolving said upright on said carriage, an arm movable on said upright projecting at right angles therefrom and rotatably adjustable with respect thereto, means movable with said carriage and revolvable with said upright for movement of said arm on said upright, a head movable on said arm, a post revolvably supported in said head, and a cutter spindle supported by said post.

HENRY L. TREBERT.